Figure 1:
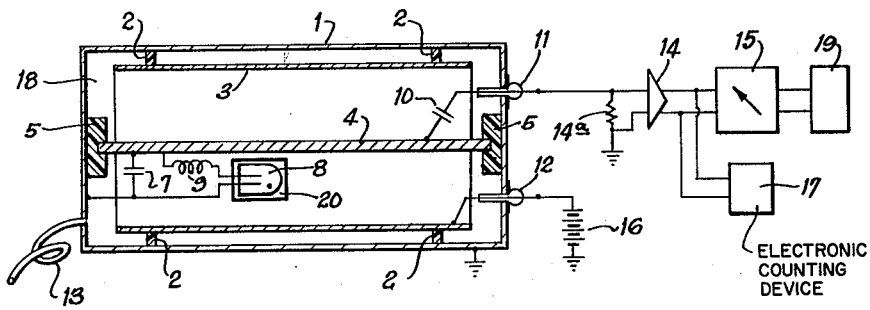

United States Patent Office 3,177,363
Patented Apr. 6, 1965

3,177,363
RADIATION DETECTION SYSTEM WITH THE IONIZATION CHAMBER AND OTHER SENSITIVE PARTS OF THE SYSTEM INCLOSED IN AN ATMOSPHERE OF INERT DRY GAS
Serge A. Scherbatskoy, 1220 E. 21st Place, Tulsa 14, Okla.
Filed May 26, 1961, Ser. No. 112,925
7 Claims. (Cl. 250—83.6)

This invention relates to apparatus for the detection and counting of gamma rays, beta rays, neutrons, and the like. It relates specifically to a radiation detector characterized by extraordinary calibration stability and mechanical ruggedness.

The types of radiation detectors most generally used today are Geiger counters and scintillation detectors, the latter type of instrument comprising a scintillating phosphor in combination with a photomultiplier tube.

Instruments of both types offer serious problems from the points of view of accurate calibration and ability to operate for long periods without "drift." Geiger counters and scintillation counters both require a regulated high-voltage power supply, and their operation is very sensitive to even small changes in supply voltage. Moreover, these instruments depend upon complex events such as the "Townsend avalanche" or secondary emission, which are complicated in theory and difficult in practice to duplicate exactly from instrument to instrument.

As a result of the aforementioned shortcomings of Geiger counters and scintillation detectors, ionization chambers are usually used for precision measurements of radiation. They also, however, have serious practical drawbacks, especially in applications where continuous service over a long period of time is called for.

Successful operation of an ionization chamber requires the maintenance within the instrument of very high leakage resistance—i.e., well nigh perfect insulation. This is not easy to achieve or to maintain. Moreover, amplification of the extremely weak D.-C. currents developed by ionization chambers is very difficult to stabilize, D.-C. amplifiers being notoriously subject to drifts and other uncontrollable effects produced by aging of tubes and other parts, supply-voltage changes, and the like.

My present invention provides a radiation detector which avoids the shortcomings of prior-art instruments and thereby achieves the highest degree of reliability, stability, and mechanical ruggednes. Broadly speaking, my invention consists of an ionization chamber whose output consists of electric voltage pulses, the frequency of occurrence of which is proportional to the intensity of the radiation field being detected. This repetition rate is essentrially dependent of changes in the supply voltage, over a wide range of voltage variation.

Well-nigh perfect insulation—leakage resistance of the order of $10^{18}$ ohms—can be obtained and maintained with relatively little difficulty inside a confined sealed space comprising an atmosphere of inert dry gas. Achieving this sort of insulation resistance in ordinary environments, however, is at best complicated and expensive—often impossible. One object of the present invention, therefore, is to provide an ionization-chamber type of radiation-detecting apparatus wherein all the sensitive parts of the system are sealed within an enclosed space containing an atmosphere of inert dry gas.

Another object of my invention, already noted, is to provide a radiation detector of the ionization-chamber type wherein the output is in the form of voltage pulses and the intensity of the field being measured is indicated by changes in the repetition rate of the pulses, rather than by changes in the magnitude of the output voltage.

Still another object of my invention is to provide a radiation detector of the ionization-chamber type the calibration of which is essentially independent of supply voltage over a very wide range of voltage variation.

Still another object of my invention is to provide an ionization-chamber type of radiation detector which will operate successfully at relatively low supply voltages, such as 300 volts.

Further objects and advantages of the invention will appear from the following detailed description of a typical embodiment thereof.

Figure 2:
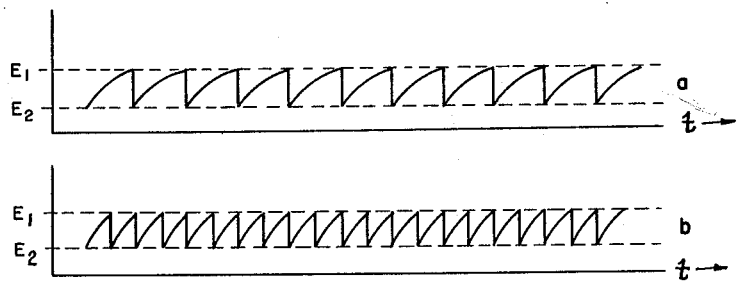
Figure 3:
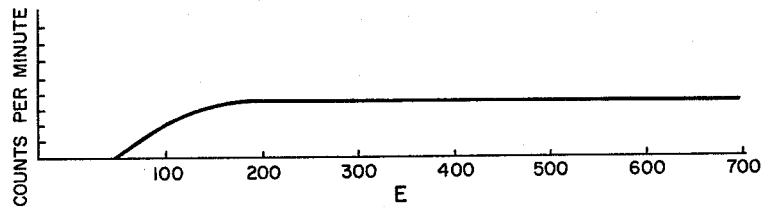

In the appended drawing, FIG. 1 illustrates, schematically and diagrammatically, an embodiment of my invention particularly adapted to the detection of gamma rays. FIG. 2 illustrates in graphic form the nature of the voltage output from the radiation detector of FIG. 1, the two graphs of FIG. 2 illustrating respectively the output from the detector produced by radiation fields of different intensities. FIG. 3 is a graph showing how the output of the FIG. 1 instrument varies as a function of supply voltage, when the radiation intensity is held constant.

Referring now to FIG. 1, I show therein an instrument enclosed in a cylindrical container 1 which may be made of brass, stainless steel, or other material that is nonporous and easily worked. At any conveniently situated part of the housing 1 I provide an evacuation tube 13 which may be used, after final assembly of the apparatus, as a means for removing the air from the housing 1 and replacing it with an atmosphere 18 of inert gas such as argon, the gas pressure preferably being several times atmospheric. It will be understood that the evacuation tube 13 will normally be sealed off after the interior of housing 1 has been filled with gas 18.

An inner cylinder 3, made of brass or other conducting material, is supported within the housing 1 by means of insulators 2, made of glass, quartz, Teflon, or other excellent insulating material. A metal rod 4 is axially disposed in the housing 1, being supported at its ends by insulators 5, which, like insulators 2, are made of high-quality insulating material.

On one of the end walls of the housing 5 I provide a pair of lead-through hermetically sealed insulators respectively designated 11 and 12; these may be of any good commercially available type such as the Kovar-glass welded lead-through manufactured by Stupakoff Corporation. An air-dielectric capacitor 10, situated within the housing 1, is connected between the central electrode 4 and the conductor which passes through the lead-through insulator 11 and is connected externally to the input of amplifier 14. The other input of amplifier 14 is grounded; the input resistance of amplifier 14, which should be of the order of several megohms, is indicated on the drawing by reference numeral 14a.

The outer cylindrical electrode 3 is connected through the lead-through insulator 12 to one terminal of D.-C. voltage source 16, conventionally indicated on the drawing as a battery. The other terminal of battery 16 is grounded, as is also the housing 1. (It will be understood, of course, that I am using the term "ground" in its conventional sense to refer to the common reference potential of the whole apparatus; i.e., "ground" does not necessarily imply an actual connection to the earth.)

An air-dielectric capacitor 7, disposed within the housing 1, is connected between the central electrode 4 and the housing 1. Connected in parallel with capacitor 7 is a series circuit comprising a glow-discharge tube 8 and an impedance element 9, shown in the drawing as a choke coil. If desired, choke coil 9 may be replaced by a resistor having a resistance of a few thousand ohms.

Surrounding the glow tube 8 is a shield 20 made of tungsten or other material capable of shielding gamma rays effectively. (The shield 20 is provided to prevent the glow tube 8 from being affected by radiation fields of extremely high intensity; in many applications, where the field intensities are moderate, the shield 20 may be omitted.)

The glow-discharge tube 8 may be of the conventional type comprising a pair of spaced electrodes sealed within a glass envelope filled with inert gas such as neon. Such tubes are well known and widely used. They are characterized by having a so-called "firing" or "breakdown" voltage, at which the gas within the tube will ionize and become conducting, and a so-called "extinction" voltage, below which the gas will re-combine and become once again non-conducting. Typical values for the firing voltage of such glow tubes are in the neighborhood of 90 volts, and typical extinction voltages are in the neighborhood of 15 volts.

The amplifier 14 may be a conventional amplifier for A.-C. signals. Its output is fed to a conventional "frequency meter" 15, i.e., an instrument which develops a varying output voltage proportional in magnitude to the repetition rate of A.-C. signals fed into it. The output of frequency meter 15 is fed to a conventional graphic recorder 16 which records, as a function of time or some other variable, the repetition-rate readings of the meter 15.

The output of the amplifier 14 may also be fed to an electronic counter 17, if a summation or integration of the total counts registered by the radiation detector is desired.

As will be explained presently, the output voltage from the detector, fed to the input of the amplifier 14, comprises a train of electric voltage pulses. It will be understood that the amplifier 14 may include, if desired, suitable pulse-shaping networks adapted to provide output pulses from amplifier 14 of appropriate shape and duration for proper actuation of the frequency meter 15.

The voltage of the supply 16 may be any convenient value within a wide range from about 300 volts upward to more than 600 volts. The capacitances of capacitors 10 and 7 are also not critical; values in the neighborhood of 100 mmf. to 250 mmf. are satisfactory. It should be noted that, while these capacitors should be of very high quality, with substantially zero leakage characteristics, it is not essential that they be of the air-dielectric type; sealed vacuum capacitors may also be used.

Operation

When the apparatus is first placed in operation, the capacitor 7 is entirely discharged, and there is therefore an electric field between the outer electrode 3 and the central electrode 4 of voltage equal to that of the supply 13. In the absence of ionizing radiation, however, no electric current will flow between electrodes 3 and 4.

When, however, the chamber 1 is exposed to gamma rays, interaction of the rays with gas atoms within the chamber 1 will split such atoms into ions bearing opposite electric charges. The ions thus formed will be collected by the respective electrodes 3 and 4, and a flow of electric current will thus take place through the space between the electrodes. This will result in a gradual accumulation of charge on the capacitor 7.

When the voltage across capacitor 7 reaches the "firing" potential of the glow tube 8, the tube will fire, rapidly discharging capacitor 7 until the extinction voltage of the glow tube is reached. At that point, the glow tube 8 will once more become non-conducting, and the process of re-charging the capacitor 7 will be resumed.

As the capacitor again charges, due to current flow produced by gamma-ray interactions within the housing 1, the firing voltage of glow tube 8 will again be reached, and a similar rapid discharge will occur. This procedure will be repeated indefinitely, at a rate depending on the intensity of the gamma-ray field to which the chamber 1 is exposed. (In the cycle of events just described, the function of the impedance 9, which may be a choke coil or a resistor, is simply to stabilize the discharges through the glow tube 8 by limiting the current therethrough to a safe value.)

FIG. 2 shows graphically the wave form of the voltage between the electrodes 3 and 4; it is of the familiar "sawtooth" shape that is characteristic of relaxation oscillators. The upper graph of FIG. 2 illustrates the pattern of voltage between the electrodes 3 and 4 as a function of time when the chamber 1 is exposed to a radiation field of given intensity, while the lower graph of FIG. 2 shows the pattern of voltage between the electrodes 3 and 4 in a field of greater intensity. Since the charging rate of the capacitor 7 is directly proportional to the field intensity, the repetition rate of the sawtooth voltage between electrodes 3 and 4 is directly proportional to the intensity of the field being detected.

Due to the differentiating action of the output network comprising capacitor 10 and resistance 14a, the relatively slow voltage rise which marks the charging of capacitor 7 will produce little effect on the amplifier 14, but the rapid discharge of capacitor 7 which occurs when the glow tube is fired will be transmitted through capacitor 10 and appear at the input of amplifier 14 as a sharply defined voltage pulse, of either positive or negative polarity, according to the direction in which voltage supply 16 is connected. This choice is of course a matter of design.

FIG. 3 illustrates the remarkable stability of my invention with respect to voltage changes in the supply 16. The graph shown in FIG. 3 plots the number of output pulses per minute supplied by my invention as a function of the voltage of power supply 16, the intensity of the radiation field being held constant. As will be seen from a study of that graph, the number of counts per minute flattens out at a uniform value when the supply voltage exceeds about 200 volts and remains substantially constant thereabove, up to a level of voltage approaching 600 volts. This highly desirable characteristic results from the fact that, when the supply voltage exceeds about 200 volts, substantially all the ion pairs generated by radiation in the gas 18 are collected by the electrodes 3 and 4, with the result that the ionization current becomes essentially independent of the supply voltage.

From the foregoing description, it will be apparent to skilled readers that I have provided an ionization-chamber type of radiation detector wherein the output signal comprises a train of electric pulses, the repetition rate whereof is proportional to the intensity of the detected field. Thus my invention permits accurate measurement of field intensity by the use of a conventional frequency meter, such as is customarily used with radiation detectors of the Geiger-counter or scintillation types. In achieving this desirable result, I have at the same time provided a radiation detector which is free from dependence on critical supply voltages, amplifier gain characteristics, and the other sources of instability which characterize Geiger counters and scintillation detectors.

As skilled readers will realize, the energy-storage and discharge system comprising capacitor 7 and glow tube 8 can if desired be situated wholly or partially outside the housing 1, electrical connection to the electrode 4 being accomplished in such event by means of a lead-through insulator such as those designated 11 and 12. To do this, however, is likely to result in serious insulation difficulties which can be avoided by disposing the components of the energy-storage and discharge circuit within the housing 1, where they are immersed in the chemically inert, dry gas 18. For that reason, therefore, the mode of construction shown in the drawing is preferable.

While I have in this specification described in considerable detail a typical embodiment of my invention, it is to be understood that the described embodiment is illustrative only, and that the scope of the invention should be determined primarily with reference to the appended claims.

I claim:

1. A radiation detector comprising a housing, said housing containing a substantially inert dry gas, a pair of electrodes therewithin, a D.-C. voltage supply, a capacitor, circuit means establishing a series circuit interconnecting said voltage supply, said capacitor, and said electrodes, whereby an electric field is established between said electrodes within said gas operative to produce a flow of ionization current responsively to dissociation of atoms in said gas by ionizing radiations interacting therewith, said flow of ionization current being operative to accumulate an electric charge on said capacitor, a normally non-conducting discharge device having the property of conducting current freely when the voltage across it exceeds a first critical value and continuing so to conduct as long as such voltage exceeds a second critical value, circuit means operative to define a discharge path for said capacitor through said discharge means, whereby said discharge means will become conducting when the accumulated voltage on said capacitor exceeds a predetermined value, such discharge means thereupon rapidly discharging said capacitor until the voltage across said capacitor reaches a second predetermined value, and means operative to sense and count over a period of time the successive discharges through said discharge means, the repetition rate of such discharges providing an index to the intensity of said ionizing radiation, said capacitor and said discharge means being carried within said housing and immersed in said gas.

2. The apparatus defined in claim 1 wherein said sensing and counting means comprises capacitive coupling means connected between one of said electrodes and a point external of said housing, said capacitive coupling means being at least partially contained within said housing.

3. A radiation detector comprising a housing, said housing containing a substantially inert dry gas, a pair of electrodes therewithin, a D.-C. voltage supply, a capacitor, circuit means establishing a series circuit interconnecting said voltage supply, said capacitor, and said electrodes, whereby an electric field is established between said electrodes within said gas operative to produce a flow of ionization current responsively to dissociation of atoms in said gas by ionizing radiations interacting therewith, said flow of ionization current being operative to accumulate an electric charge on said capacitor, a normally non-conducting discharge device having the property of conducting current freely when the voltage across it exceeds a first critical value and continuing so to conduct as long as such voltage exceeds a second critical value, circuit means operative to define a discharge path for said capacitor through said discharge means, whereby said discharge means will become conducting when the accumulated voltage on said capacitor exceeds a predetermined value, such discharge means thereupon rapidly discharging said capacitor until the voltage across said capacitor reaches a second predetermined value of lower magnitude than said first predetermined value, and means operative to indicate the repetition rate of the successive discharges through said discharge means, such rate providing an index to the intensity of said ionizing radiation.

4. The apparatus defined in claim 3 wherein said capacitor and said discharge means are carried within said housing and immersed in said gas.

5. The apparatus defined in claim 4 wherein said repetition-rate indicating means comprises capacitive coupling means connected between one of said electrodes and a point external of said housing, said capacitive coupling means being at least partially contained within said housing.

6. In a radiation detector, means comprising a pair of spaced-apart conductive electrodes and defining an enclosed space, an atmosphere of substantially inert, ionizable, dry gas confined within and filling said space, a circuit including said electrodes and also including a D.-C. voltage supply, operative to establish an electric field between said electrodes within said gas and to produce a flow of ionization current between said electrodes responsively to dissociation of atoms in said gas by ionizing radiations interacting therewith, a normally non-conducting discharge device forming a part of said circuit and having the property of conducting current freely when the voltage across it exceeds a first critical value and continuing so to conduct as long as such voltage exceeds a second critical value, said circuit including electrical capacitance capable of storing charge, flow of ionization current between said electrodes being operative to change the quantity of charge stored in said capacitance and thereby to alter the voltage across said discharge device to render the same momentarily conductive, flow of current through said discharge device during said conduction period being operative to change said quantity of charge in the opposite sense to offset the change therein produced by said ionization current, whereby a train of current pulses through said discharge device is generated by said detector responsively to ionizing radiations interacting therewith, and means operative to sense and count such current pulses, said discharge means being physically disposed within said enclosed space and immersed in said gas.

7. In a radiation detector, means comprising a pair of spaced-apart conductive electrodes and defining an enclosed space, an atmosphere of substantially inert, ionizable, dry gas confined within and filling said space, a D.-C. voltage supply, circuit means comprising said voltage supply and said electrodes operative to establish an electric field between said electrodes, causing ionization current to flow therebetween when atoms of said gas are ionized by ionizing radiations such as gamma rays, said circuit means including charge-accumulating means and also including voltage-sensitive, normally non-conducting discharge means characterized by the property of conducting current freely whenever the voltage thereacross exceeds a critical value, the flow of ionization current in the presence of radiation being operative to change in one sense the quantity of charge stored in said charge-accumulating means, thereby raising the voltage across said discharge means to a level above said critical value and rendering said means conductive, flow of current through said discharge means being operative to change in the opposite sense said quantity of stored charge and thus render said discharge means again non-conductive, and means for sensing the repetition rate at which said discharge means is rendered conductive, such repetition rate being substantially proportional to the intensity of said ionizing radiations, said discharge means being physically disposed within said enclosed space and immersed in said gas.

References Cited by the Examiner

UNITED STATES PATENTS

| | | | |
|---|---|---|---|
| 2,639,390 | 5/53 | Scherbatskoy | 250—83.6 |
| 2,756,347 | 7/56 | White | 250—83.6 |
| 2,833,932 | 5/58 | Constable | 313—93 X |
| 2,884,533 | 4/59 | Richard-Foy | 250—83.6 |
| 2,948,812 | 8/60 | Quinn | 250—83.6 |
| 2,983,818 | 5/61 | Constable | 250—83.6 |
| 2,995,661 | 8/61 | White | 250—83.6 |
| 3,065,349 | 11/62 | Achtellik | 250—83.6 |

RALPH G. NILSON, *Primary Examiner.*

JAMES W. LAWRENCE, *Examiner.*